March 28, 1939.  C. W. STUDLEY  2,152,103
GLASS FORMING MACHINE
Filed May 14, 1937  2 Sheets-Sheet 1
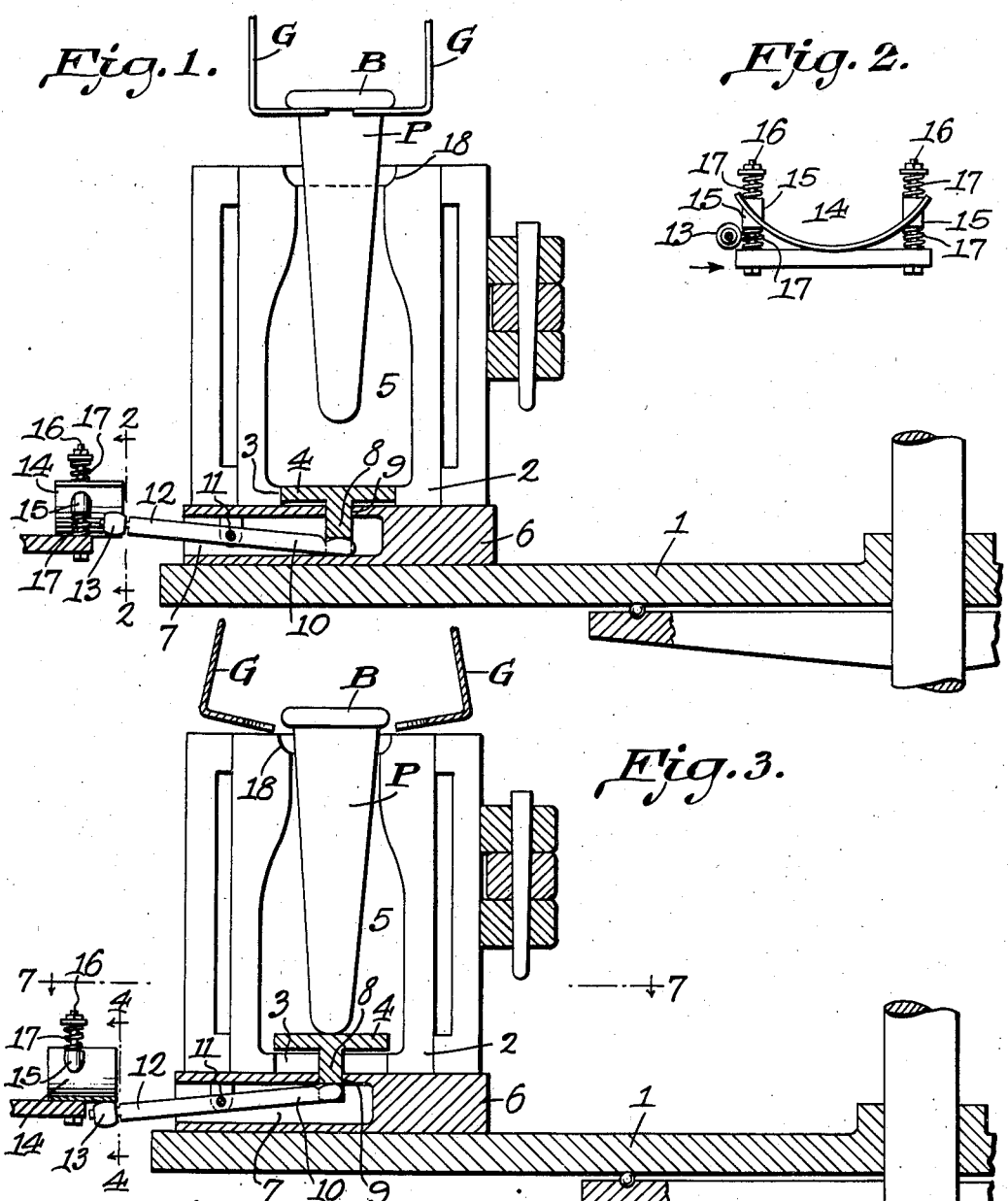
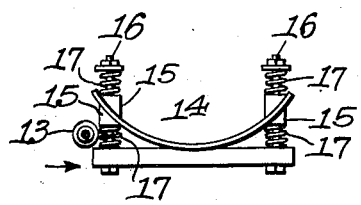
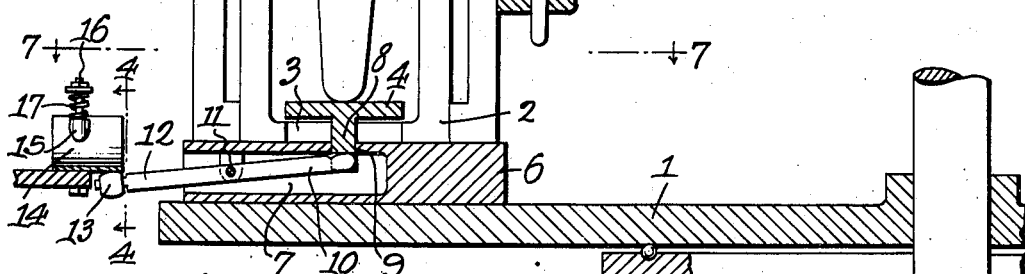
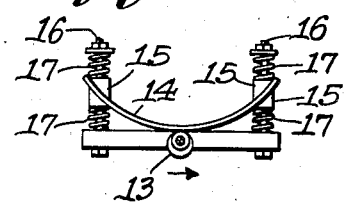
Inventor
C. W. Studley March 28, 1939.　　C. W. STUDLEY　　2,152,103
GLASS FORMING MACHINE
Filed May 14, 1937　　2 Sheets-Sheet 2
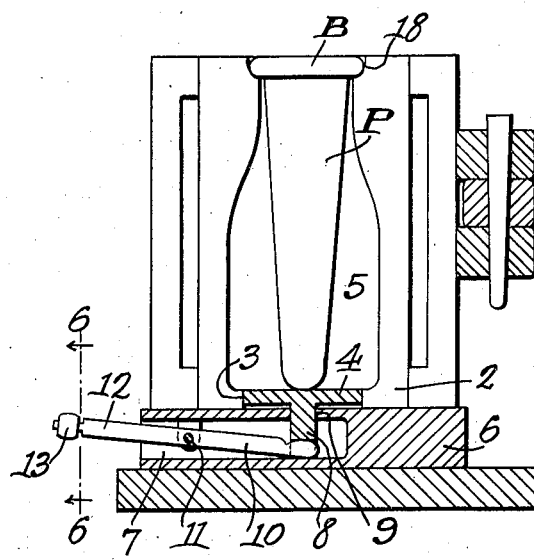
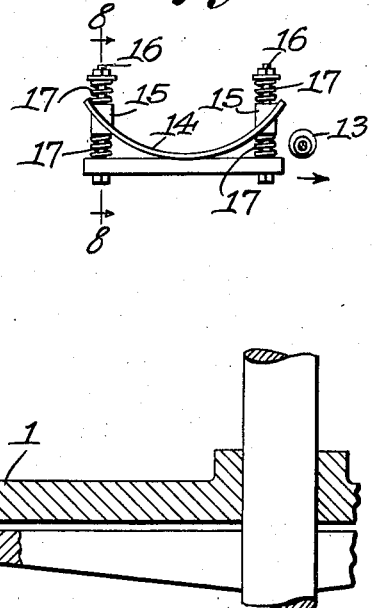
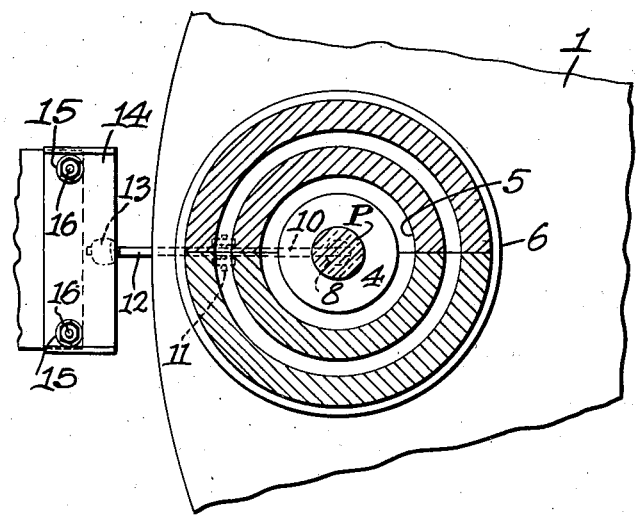
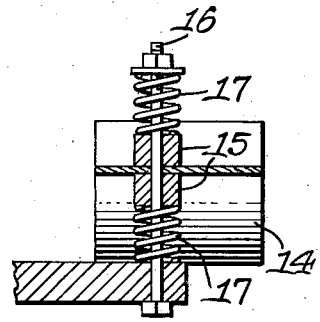
Inventor
C. W. Studley Patented Mar. 28, 1939

2,152,103

UNITED STATES PATENT OFFICE 2,152,103

GLASS FORMING MACHINE

Charles W. Studley, Sapulpa, Okla., assignor to Liberty Glass Co., Sapulpa, Okla.

Application May 14, 1937, Serial No. 142,694

9 Claims. (Cl. 49—14)

This invention relates to machines for forming glass bottles and similar articles and is designed more especially as a means for preventing breakage of these articles when the parison is delivered into the blow mold.

As is well known to those skilled in the art, glass containers, such as bottles, are usually suspended in the blow mold by a ball or other form of hang-up which is dropped to a seat when the grippers used for transferring the parison are disengaged therefrom. During the dropping of the parison to the seat, breakage frequently occurs adjacent to the point where the seat is engaged and it is an object of the present invention to eliminate this waste by providing a means whereby the parison, when released from its transfer mechanism, is lowered gently within the blow mold until the ball hang-up or the like arrives at its seat.

A further object is to provide a parison seating device which is controllably lowered so that the parison will be brought to rest gently and the blow mold made ready for the blowing operation without any injury being caused to the parison.

A further object is to provide a parison lowering mechanism controlled by the operation of the table carrying the blow mold whereby said lowering device will be actuated at the proper point during the cycle of movement of the mold.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a section through a blow mold and a portion of its supporting structure located at the point where the parison is lowered into the mold, said parison being shown in position prior to its release.

Figure 2 is a section on line 2—2, Figure 1.

Figure 3 is a view similar to Figure 1 showing the position of the parts after the parison has been released and delivered onto the lowering device.

Figure 4 is a section on line 4—4, Figure 3.

Figure 5 is a view similar to Figures 3 and 4 showing the relative positions of the parts after the parison has been completely lowered and ready for the final blowing operation.

Figure 6 is a section on line 6—6, Figure 5.

Figure 7 is a section on line 7—7, Figure 3.

Figure 8 is a section on line 8—8, Figure 6, said section being on an enlarged scale.

Referring to the figures by characters of reference 1 designates the usual movable table supporting a blow mold 2 adapted, on arrival at one station, to close about a parison P which has been partly moved thereinto by the transfer members or grippers G.

The blow mold 2 has an opening 3 in the base thereof for receiving a plate 4 which normally is flush with the bottom surface of the cavity 5 in the mold. Said mold can be mounted on a base 6 having a recess 7 therein which opens outwardly toward the margin of the table 1. Plate 4 has a stem 8 extending downwardly into the recess 7 and guided within an opening 9. The lower end of this stem bears upon one end of a controlling lever 10 which is fulcrumed at 11 and has an arm 12 extending outwardly beyond the table and provided preferably with a roller 13.

There is provided adjacent to the station where the parison is delivered into the blow mold, a deflecting element which, in the structure illustrated, comprises an arcuate cam plate 14 having its convex surface lowermost while its end portions are provided with sleeves 15 slidable on guide pins 16. Cushioning springs 17 are mounted on these pins above and below the sleeves so as to hold the sleeves properly centered and with the central or intermediate portion of the cam plate normally positioned below the path of the roller 2 while the end portions of the cam plate are normally positioned above the path of this roller. These relative positions are clearly apparent in Figure 2.

The weight of the plate 4 normally maintains said plate in the opening 3 with the roller-carrying end of lever 10 elevated as shown in Figure 1. When the blow mold is closed about the parison at the station where the cam is located, roller 13 comes against cam 14 and is depressed thereby until it reaches the center of the cam, as shown in Figure 3. At this point the transfer devices or grippers G become disengaged automatically from the parison which is permitted to move gently onto the elevated plate 4 as shown in Figure 3. As the table continues to move, the roller 13 will gradually travel upwardly along the remaining portion of cam 14, thus allowing the plate 4 to slowly move downwardly under complete control, at the same time allowing the parison to move downwardly until the hang-up, which can be in the form of a bead B or the like, is brought gently to the seat 18 provided therefor in the upper portion of the blow mold. When the parison is thus properly seated, the plate 4 assumes a position flush with the bottom surface of the cavity 5, as shown in Figure 5 and the mold thus continues to the next station where the final blowing operation is effected.

Importance is attached to the fact that in the present structure the lowering of the parison to its seat in the neck portion of the mold is under automatic control so that danger of injury to the neck portion of the formed article is eliminated and the waste of material due to scars and breakage is practically eliminated. Should a cushioning effect be desired, the sleeves 15 are free to slide along the pins 17 against the action of the spring so that injury due to the sudden droppage of the parison onto the plate 4 is avoided.

What is claimed is:

1. The combination with a movable table, a blow mold, and means for lowering a parison into the blow mold, said blow mold having a seat in its upper portion for engagement by the neck finish of the parison, of a member seated within the bottom portion of the blow mold, and resilient means controlled by the movement of the table for elevating said member within the blow mold to receive the weight of the parison when released within the blow mold and for controllably lowering said member to lower the parison onto said seat.

2. The combination with a movable table, a blow mold thereon, and means for positioning a parison within the blow mold, said blow mold having a seat at its upper end, of an element normally seated in the bottom of the blow mold, and yielding means controlled by the movement of the table for lifting said element within the blow mold to a position for yieldingly receiving the weight of the parison when released, and for controllably lowering said element to bring the parison gently to said seat for support thereby.

3. The combination with a movable table, a blow mold thereon, and means for suspending a parison within the blow mold and releasing it, there being a seat at the upper end of the blow mold, of an element normally seated in the bottom of the blow mold, and cooperating pliant and movable means controlled by the movement of the table, for lifting said element into position to receive the weight of the parison when released and for controllably lowering said element and the engaged parison to position said parison gently upon said seat.

4. The combination with a movable table, a blow mold thereon, and means for suspending a parison within the blow mold and releasing it, there being a seat at the upper end of the blow mold, of an element normally seated in the bottom of the blow mold, and cooperating fixed and movable means controlled by the movement of the table, for lifting said element into position to receive the weight of the parison when released and for controllably lowering said element and the engaged parison to position said parison gently upon said seat, said means including a yieldingly restrained cam normally fixed relative to the table, and means connected to said element and movable with the table for engagement and actuation by the cam.

5. The combination with a movable table, a blow mold thereon, and means for depositing and releasing a parison within the blow mold, said mold having a seat at its upper end, of a member movably mounted in the bottom portion of the blow mold, a yieldingly restrained cam adjacent to the path of the table, means movable with the table and into and out of engagement with said cam for elevating said member to receive the weight of the parison when released and for controllably lowering said member following such release to deposit the parison gently upon said seat.

6. The combination with a movable table, a blow mold carried thereby, and means for depositing a parison in the mold and releasing it, of means controlled by the movement of the table for yieldingly receiving the weight of the released parison and lowering it gently within the mold.

7. The combination with a movable table, a blow mold thereon having a seat at its upper end, and means for depositing a top flanged parison in the mold and releasing it, of a member in the lower portion of the mold and forming a portion of the bottom thereof, and cooperating means adjacent to and upon the table respectively for controllably elevating said member to receive the weight of the parison when released and for lowering the parison to bring its top flange gently to said seat.

8. The combination with a movable table, a blow mold thereon having a seat at its upper end, and means for depositing a parison in the mold and releasing it, of a member in the lower portion of the mold and forming a portion of the bottom thereof, and cooperating means adjacent to and upon the table respectively for controllably elevating said member to receive the weight of the parison when released and for lowering the parison to bring it gently to said seat, one of said cooperating means constituting a cushioning element.

9. The combination with a rotary table, of a sectional blow mold mounted on the table, said mold being designed to receive a blank and suspend it therein, a member operating through the bottom of the mold for engaging the blank to support it, and resilient means for automatically releasing said member at a predetermined point during the rotation of the table for gravitation thereby to lower the blank.

CHAS. W. STUDLEY.